United States Patent
Tsuna

(10) Patent No.: US 9,541,135 B2
(45) Date of Patent: Jan. 10, 2017

(54) GEL LUBRICANT, ROLLING BEARING, PIVOT ASSEMBLY BEARING, AND HARD DISK DRIVE

(71) Applicant: MINEBEA CO., LTD., Kitasaku-gun, Nagano-ken (JP)

(72) Inventor: Motojiro Tsuna, Kitasaku-gun (JP)

(73) Assignee: MINEBEA CO., LTD., Kitasaku-gun (JP)

(*) Notice: Subject to any disclaimer, the term of this patent is extended or adjusted under 35 U.S.C. 154(b) by 0 days.

(21) Appl. No.: 14/323,573

(22) Filed: Jul. 3, 2014

(65) Prior Publication Data
US 2015/0030275 A1 Jan. 29, 2015

(30) Foreign Application Priority Data
Jul. 23, 2013 (JP) ................. 2013-152815

(51) Int. Cl.
*C10M 169/04* (2006.01)
*F16C 19/00* (2006.01)
*F16C 33/66* (2006.01)

(52) U.S. Cl.
CPC ...... *F16C 33/6651* (2013.01); *C10M 169/041* (2013.01); *F16C 33/6692* (2013.01); *C10M 2205/022* (2013.01); *C10M 2205/0285* (2013.01); *C10M 2205/04* (2013.01); *C10M 2207/2805* (2013.01); *C10M 2207/288* (2013.01); *C10M 2207/2835* (2013.01); *C10M 2215/064* (2013.01); *C10M 2215/223* (2013.01); *C10M 2223/00* (2013.01); *C10M 2223/04* (2013.01); *C10N 2220/022* (2013.01); *C10N 2230/70* (2013.01); *C10N 2240/02* (2013.01); *C10N 2240/204* (2013.01); *C10N 2250/10* (2013.01)

(58) Field of Classification Search
CPC ................... C10M 2207/282; C10M 2205/066
USPC .................................. 508/481; 384/462, 470
See application file for complete search history.

(56) References Cited

U.S. PATENT DOCUMENTS 5,047,159 A * 9/1991 Zehler .................. C10M 155/02
508/208
2009/0258210 A1* 10/2009 Iyad .................. A61F 13/15593
428/220

FOREIGN PATENT DOCUMENTS

JP A-2002-327188 11/2002
JP A-2004-339447 12/2004

* cited by examiner

*Primary Examiner* — Vishal Vasisth
(74) *Attorney, Agent, or Firm* — Oliff PLC

(57) ABSTRACT

There is provided a gel lubricant including: a base oil containing an ester synthetic oil and a synthetic hydrocarbon oil in which the mass ratio (X:Y) of the ester synthetic oil (X) to the synthetic hydrocarbon oil (Y) is in the range of 35:65 to 75:25; and a gelatinizer which contains two kinds of styrene block copolymers and is included in the gel lubricant in an amount of 1.5% by mass to 10% by mass.

16 Claims, 8 Drawing Sheets

GEL LUBRICANT, ROLLING BEARING, PIVOT ASSEMBLY BEARING, AND HARD DISK DRIVE

CROSS REFERENCE TO RELATED APPLICATION

The present application claims priority from Japanese Patent Application No. 2013-152815 filed on Jul. 23, 2013, the disclosure of which is incorporated herein by reference in its entirely.

BACKGROUND OF THE INVENTION

Field of the Invention

The present invention relates to a gel lubricant, a rolling bearing filled with the gel lubricant, and a pivot assembly bearing provided with the rolling bearing. The present invention further relates to a hard disk drive including the pivot assembly bearing.

Description of the Related Art

A hard disk drive which is an information recording apparatus of a computer records information on a magnetic disk and retrieves the recorded information from the magnetic disk by moving a magnetic head over the magnetic disk. The magnetic head is generally attached to the tip of a swing arm which is swingably supported by a rolling bearing. The rolling bearing device which swingably supports the swing arm is called as a pivot assembly bearing.

Many kinds of lubricants have been suggested to facilitate the drive of the pivot assembly bearing. Examples of such lubricants include grease lubricants containing a base oil and a thickener composed of a urea compound or lithium soap. Japanese Patent Application Laid-open No. 2004-339447 discloses a grease lubricant containing a base oil, a thickener composed of a urea compound, and styrene block copolymer.

Although not used for the rolling bearing, Japanese Patent Application Laid-open No. 2002-327188 discloses a lubricant which contains a base oil and styrene block copolymer but does not contain any thickener. The lubricant disclosed in Japanese Patent Application Laid-open No. 2002-327188 is in a gel state and is an oil non-separating lubricant which completely prevents the separation of oil for a long period of time. Such a lubricant is suitably used for a sliding part of the gear of an electrical and electronic component and sliding parts of a switch and a relay connector.

In recent years, the magnetic head is required to move shorter distance in shorter time as the miniaturization, the growth in data density and the high speed are achieved for the hard disk drive. As a result, the magnetic head now repeatedly moves and stops very rapidly. Under such a situation that the pivot assembly bearing is overloaded, there is a demand for a lubricant capable of stably driving the bearing for a long period of time at a low torque while suppressing torque variation. Further, as the miniaturization is achieved for the hard disk drive and the pivot assembly bearing, the amount of the lubricant to be enclosed is decreased. Therefore, the need for increasing the ratio of the base oil which mainly contributes to lubrication is also increased to obtain a sufficient lubricating property even in a case that an amount of enclosed lubricant is small.

However, with respect to the grease lubricant disclosed in Japanese Patent Application Laid-open No. 2004-339447 containing the urea compound as the thickener, there is a possibility that the urea compound might be aggregated and solidified to cause great torque variation and thus might cause an operation failure of the magnetic head. While a rolling bearing generally rotates in one direction, the pivot assembly bearing performs an oscillating motion repeatedly rotating in forward and reverse directions at a very small angle. Thus, the grease lubricant is pushed to both lateral sides of rolling elements such as balls in the rolling bearing to generate a mass (channeling phenomenon), and the torque variation is caused when the ball attempts to ride over the mass. In the worst case, the bearing is locked and cannot be driven. In a case of the grease lubricant using the lithium soap as the thickener, the grease is always in a mixed state in the bearing once the pivot assembly bearing is driven (churning phenomenon). Thus, the torque is high right after the pivot assembly bearing is driven, and also the torque variation is great. Moreover, the grease lubricant is generally required to contain the thickener in an amount of around 12% by mass. Thus, the blending amount of the base oil is in a range of 85% by mass to 90% by mass and it is difficult to further increase the ratio of the base oil contributing to the lubrication.

Japanese Patent Application Laid-open No. 2002-327188 discloses a gel lubricant containing no thickener. The disclosed gel lubricant, however, is the oil non-separating lubricant which does not cause any separation of the oil. In the rolling bearing, the surface of a rotating ball is required to be covered with the oil of the lubricant. Thus, the lubricant disclosed in Japanese Patent Application Laid-open No. 2002-327188 with no oil separation cannot be applied as a lubricant for the rolling bearing.

SUMMARY OF THE INVENTION

An object of the present invention is to provide a lubricant for rolling bearing capable of stably driving a rolling bearing for a long period of time at a low torque while suppressing torque variation.

According to a first aspect of the present invention, there is provided a gel lubricant including: a base oil containing an ester synthetic oil and a synthetic hydrocarbon oil in which the mass ratio (X:Y) of the ester synthetic oil (X) to the synthetic hydrocarbon oil (Y) is in the range of 35:65 to 75:25; and a gelatinizer containing two kinds of styrene block copolymers and being included in the gel lubricant in an amount of 1.5% by mass to 10% by mass in relation to total mass of the gel lubricant.

In this aspect, the two kinds of styrene block copolymers may be composed of a first styrene block copolymer and a second styrene block copolymer different from the first styrene block copolymer. The mass ratio (m:n) of the first styrene block copolymer (m) to the second styrene block copolymer (n) may be in the range of 80:20 to 20:80. The two kinds of styrene block copolymers may be selected from the group consisting of styrene-(ethylene/propylene)-styrene block copolymer (SEPS), styrene-(ethylene-ethylene/propylene)-styrene block copolymer (SEEPS), styrene-(ethylene/propylene) block copolymer (SEP), styrene-(ethylene/butylene)-styrene block copolymer (SEBS), styrene-butadiene-styrene block copolymer (SBS), and styrene-isoprene-styrene block copolymer (SIS). The ester synthetic oil may be at least one selected from the group consisting of trioctyl trimellitate (TOTM), pentaerythritol fatty acid ester, and tetraoctyl pyromellitate (TOPM), and the synthetic hydrocarbon oil may be poly-α-olefin (PAO) or alkyl naphthalene.

In this aspect, the mass ratio (X:Y) of the ester synthetic oil (X) to the synthetic hydrocarbon oil (Y) may be in the range of 40:60 to 70:30, and the gelatinizer may be contained in the gel lubricant in an amount of 2% by mass to 9% by mass. The two kinds of styrene block copolymers may be styrene-(ethylene/propylene)-styrene block copolymer (SEPS) and styrene-(ethylene-ethylene/propylene)-styrene block copolymer (SEEPS). The ester synthetic oil may be trioctyl trimellitate (TOTM) and the synthetic hydrocarbon oil may be poly-α-olefin (PAO). The gel lubricant related to this aspect may further include an extreme pressure additive. The gel lubricant related to this aspect may contain no thickener.

According to a second aspect of the present invention, there is provided a rolling bearing including: an outer race; an inner race which is arranged coaxially with the outer race on an inner circumferential side of the outer race; a plurality of rolling elements disposed between the outer race and the inner race; a retainer retaining the rolling elements; and the gel lubricant as defined in the first aspect which is filled between the outer race and the inner race.

In this aspect, a plurality of pockets in which the rolling elements are accommodated may be formed in the retainer and a lubricant retaining portion retaining the gel lubricant may be provided between the adjacent pockets. The lubricant retaining portion may be provided with a recess or a protrusion. A circumferential wall may be provided around the lubricant retaining portion.

According to a third aspect of the present invention, there is provided a pivot assembly bearing including the rolling bearing as defined in the second aspect.

According to a fourth aspect of the present invention, there is provided a hard disk drive including the pivot assembly bearing as defined in the third aspect.

DESCRIPTION OF THE PREFERRED EMBODIMENTS

[First Embodiment]

Figure 1:
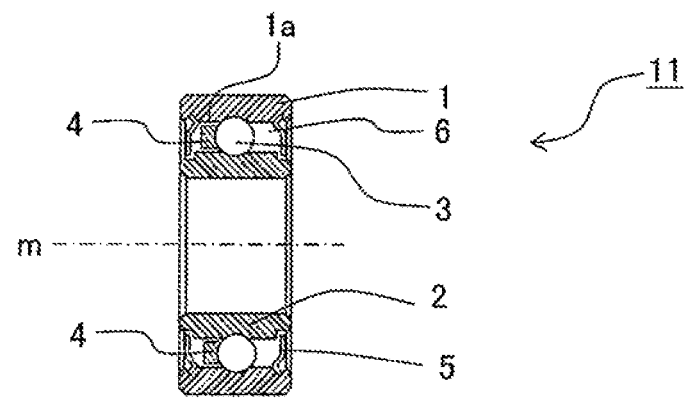
FIG. 1 is a cross-sectional view of a rolling bearing according to a second embodiment of the present invention.

A gel lubricant will be explained as a first embodiment of the present invention. The gel lubricant related to this embodiment includes a base oil containing an ester synthetic oil and a synthetic hydrocarbon oil and a gelatinizer containing two kinds of styrene block copolymers.

The ester synthetic oil contained in the base oil is not especially limited, and it is possible to use a diester oil, a neopentyl polyol ester oil, a complex ester oil of the diester oil and the neopentyl polyol ester oil, an aromatic ester oil, a carbonic acid ester oil, a glycerin ester oil, and the like. From the viewpoint of having excellent lubricating property and sufficient heat resistance, a preferred ester synthetic oil is exemplified by trioctyl trimellitate (TOTM), pentaerythritol fatty acid ester, tetraoctyl pyromellitate (TOPM), or any mixture thereof. The trioctyl trimellitate (TOTM) is particularly preferred. The synthetic hydrocarbon oil contained in the base oil is not especially limited, and it is possible to use poly-α-olefin, ethylene-α-olefin copolymer, polybutene, alkyl benzene, alkyl naphthalene, and the like. The poly-α-olefin (PAO), the alkyl naphthalene, or any mixture thereof is preferred, and the poly-α-olefin (PAO) is particularly preferred. Each of the synthetic hydrocarbon oils described above contributes to the formation of a gel which demonstrates the lubricating property by releasing (discharging) an appropriate amount of oil (base oil) and at the same time showing adequate stickiness.

The base oil related to this embodiment may contain a base oil other than the ester synthetic oil and the synthetic hydrocarbon oil in a proportion that the effect of the present embodiment can be obtained. The base oil referred to this embodiment, however, is preferably composed only of the ester synthetic oil and the synthetic hydrocarbon oil, because the gel lubricant having the adequate stickiness can be obtained by using the ester synthetic oil, which has a high polarity and is less likely to gel or gelate, in combination with the synthetic hydrocarbon oil which has a low polarity and is more likely to gel. Since the viscosity of the base oil directly affects the torque of the pivot assembly bearing, the base oil related to this embodiment containing the ester synthetic oil and the synthetic hydrocarbon oil preferably has kinetic viscosity of 50 mm$^2$/s to 120 mm$^2$/s at 40 degrees Celsius.

In the base oil related to this embodiment, the mass ratio (X:Y) of the ester synthetic oil (X) to the synthetic hydrocarbon oil (Y) is 35:65 to 75:25 when the total amount (X+Y) of the ester synthetic oil (X) and the synthetic hydrocarbon oil (Y) is 100. In a case that the ratio of the ester synthetic oil (X) decreases and the mass ratio (X:Y) becomes less than 35:65, the gelation proceeds excessively and the oil (base oil) is less likely to be separated from the gel. On the other hand, in a case that the ratio of the ester synthetic oil (X) increases and the mass ratio (X:Y) becomes more than 75:25, the gelation occurs but the base oil separates excessively from the gel, which facilitates the separation into the base oil and a rigid gel having low stickiness. The mass ratio (X:Y) of the ester synthetic oil (X) to the synthetic hydrocarbon oil (Y) is preferably 40:60 to 70:30 and more preferably 50:50 to 70:30. By making the mass ratio within the above ranges, it is possible to obtain a gel lubricant which is particularly suitable for the rolling bearing.

The base oil related to this embodiment may be contained in an amount of 85% by mass to 98% by mass with respect to the total amount of the gel lubricant. In this embodiment, the ratio of the base oil in the gel lubricant may be increased up to 90% by mass to 98% by mass because although the ratio of the thickener in a conventional grease lubricant is required to be around 12% by mass, the content of the gelatinizer in the gel lubricant related to this embodiment can be reduced to about 1.5% by mass to 10% by mass with respect to the total amount of the gel lubricant. By increasing the content ratio of the base oil in the gel lubricant, the amount of the oil contributing to the lubrication can be secured even though the gel lubricant is contained in a small amount, thereby making the gel lubricant related to this embodiment be suitably usable for a small pivot assembly bearing installed in a thin hard disk drive.

Unlike the gelatinizer included in any conventional grease lubricant, the "gelatinizer" included in the gel lubricant of this embodiment is not a substance which turns the state of the base oil (oil) into semi-solid or solid. Rather, the "gelatinizer" included in the gel lubricant of this embodiment is a substance which turns the base oil into a gel state with some degree of stickiness. Further, an object of the gelatinizer is to exude an appropriate amount of base oil from the formed gel. As the gelatinizer, it is possible to use, for example, a high molecular compound such as elastomer, and the gelatinizer is distinguished from the thickener which will be described later. The two kinds of styrene block copolymers included in the gelatinizer related to this embodiment are exemplified by styrene-(ethylene/propylene)-styrene block copolymer (SEPS); styrene-(ethylene-ethylene/propylene)-styrene block copolymer (SEEPS); styrene-(ethylene/propylene) block copolymer (SEP); styrene-(ethylene/butylene)-styrene block copolymer (SEBS); styrene-butadiene-styrene block copolymer (SBS); and styrene-isoprene-styrene block copolymer (SIS). The two kinds of styrene block copolymers are preferably styrene-(ethylene/propylene)-styrene block copolymer (SEPS) and styrene-(ethylene-ethylene/propylene)-styrene block copolymer (SEEPS). The styrene block copolymers can gelate the base oil containing the ester synthetic oil and the synthetic hydrocarbon oil such that an appropriate amount of oil exudes (separates) therefrom.

The two kinds of styrene block copolymers are composed of a first styrene block copolymer and a second styrene block copolymer which are different from each other. The mass ratio (m:n) of the first styrene block copolymer (m) to the second styrene block copolymer (n) is preferably (m:n)=80:20 to 20:80, provided that the total amount (m+n) of the first styrene block copolymer (m) and the second styrene block copolymer (n) is 100. By making the mass ratio (m:n) within the above range, the gel lubricant related to this embodiment is capable of realizing both an adequate gel state and an appropriate amount of the separated oil (base oil). The gelatinizer containing the two kinds of styrene block copolymers is included in an amount of 1.5% by mass to 10% by mass with respect to the total amount of the gel lubricant. Preferably, the gelatinizer containing the two kinds of styrene block copolymers is included in an amount of 2% by mass to 9% by mass with respect to the total amount of the gel lubricant. By making the blending amount of the gelatinizer within the above ranges, it is possible to obtain the gel lubricant from which the oil exudes (separates) in an appropriate amount. Note that the gelatinizer related to this embodiment may contain a compound other than the two kinds of styrene block copolymers within a range that the effect of the present invention can be obtained. In such a case, however, the adjustments of blending amount, blending order and the like become complex. Thus, the gelatinizer is preferably composed only of the two kinds of styrene block copolymers.

As described above, the gel lubricant related to this embodiment includes the base oil containing the ester synthetic oil and the synthetic hydrocarbon oil and the gelatinizer containing two kinds of styrene block copolymers. The mass ratio (X:Y) of the ester synthetic oil (X) to the synthetic hydrocarbon oil (Y) is 35:65 to 75:25. The gelatinizer is included in the gel lubricant in an amount of 1.5% by mass to 10% by mass. In a particularly preferred gel lubricant, the mass ratio (X:Y) of the ester synthetic oil (X) to the synthetic hydrocarbon oil (Y) is 40:60 to 70:30, and the gelatinizer is included in the gel lubricant in an amount of 2% by mass to 9% by mass. The inventor of the present invention has found out that, by using the base oil composed of the ester synthetic oil and the synthetic hydrocarbon oil as the two kinds of oils and the gelatinizer composed of the two kinds of styrene block copolymers in the mass ratios as described above, it is possible to obtain the gel lubricant which has the moderate stickiness and from which the oil is exuded (separated) in an appropriate amount. In a case that the gel lubricant related to this embodiment is used for the rolling bearing such as a ball bearing, the gel lubricant has the stickiness to retain the gel lubricant on a retainer and the oil can be discharged from the gel in an appropriate amount such that the oil is supplied to inner and outer races and to the surface of a ball. In such a manner, although being the gel lubricant, a low torque which is the advantage of oil lubrication can be achieved by retaining the gel portion (gel component) on the retainer and supplying the oil only in the appropriate amount continuously to the inner and outer races and the balls. Since the oil is gradually supplied to the inner and outer races and the surface of the ball, the rolling bearing using the gel lubricant related to this embodiment has a long service life. Further, since the gel component is remained in the retainer, the gel component is prevented from entering between the inner and outer races and the ball which would otherwise cause an increase in the torque. Further, even after used for a long period of time, the gel lubricant related to this embodiment does not generate any aggregation such as urea, and thus the torque variation is small.

The gel lubricant related to this embodiment is particularly excellent as a lubricant for a pivot assembly bearing. The pivot assembly bearing does not rotate in a constant direction, but repeats oscillating motion at a high speed to move a magnetic head of a hard disk drive on a disk, and thus the pivot assembly bearing is required to have a fast response speed for moving the magnetic head to an accurate position. The gel lubricant related to this embodiment can reduce the torque variation of the pivot assembly bearing, and thus it becomes capable of positioning the magnetic head accurately, and also the response speed of the magnetic head is accelerated due to the low torque value.

It is presumed that the reason why the gel lubricant related to this embodiment can obtain the above effect is that the gel lubricant related to this embodiment has the composition in which the compatibility between the base oil and the gelatinizer is optimal. In a case that the compatibility between the base oil and the gelatinizer is too high, the viscosity of the base oil increases but the gel is not formed easily. When using such a lubricant for the rolling bearing, not only the oil (base oil) but also imperfect gel flows to the inner and outer races and the surface of the ball. Further, in the case that the compatibility between the base oil and the gelatinizer is too high, once the base oil has turned into the gel, it is more likely that the amount of separated oil is too small and the stickiness of the gel is high. On the other hand, in a case that the compatibility between the base oil and the gelatinizer is too low, the gel becomes unstable. Then, the oil is separated with time and is discharged in a large amount. Therefore, it is presumed that the gel lubricant related to this embodiment has the composition in which the compatibility between the base oil obtained by mixing the ester synthetic oil with the synthetic hydrocarbon oil and the gelatinizer composed of the two kinds of styrene block copolymers is optimal.

The styrene block copolymer used for the gelatinizer in this embodiment is generally used as a viscosity adjuster for adjusting the viscosity of the base oil. As the viscosity adjuster, a polymer having a polarity similar to that of the base oil, namely a polymer having a high compatibility with the base oil, is conventionally selected. In a case that the base oil is the ester synthetic oil, for example, polymethyl methacrylate (PMMA) is used. In a case that the base oil is the synthetic hydrocarbon oil, for example, the styrene block copolymer exemplified by SEPS and SEEPS is used. The inventor of the present invention initially attempted to prepare the gel lubricant by selecting the ester synthetic oil having superior lubricating property and heat resistance as the base oil and adding PMMA having a high compatibility with the ester synthetic oil. However, when PMMA was added to the ester synthetic oil, the gelation was difficult to occur and once the ester synthetic oil was gelated, the amount of the separated oil was too small. Although the stickiness of the gel was high, the gel was in a state of being easily broken into small lumps under stirring (the gel was in a state of shear instability). Therefore, the gel state intended by the inventor could not be obtained. In view of this, the inventor considered that the compatibility between the base oil and the gelatinizer needed to be optimized in order to obtain the intended gel state capable of achieving moderate stickiness and also causing the oil (base oil) to be discharged in an appropriate amount. Then, the inventor deliberately added, to the ester synthetic oil, the styrene block copolymer which is the gelatinizer having a low compatibility with the ester synthetic oil, and subsequently added the synthetic hydrocarbon oil to the mixture so that the ester synthetic oil and the styrene block copolymer were compatibly dissolved with each other. It is presumed that, in the gel lubricant related to this embodiment, the synthetic hydrocarbon oil functions as the base oil and also as a binder between the ester synthetic oil and the styrene block copolymer. Further, as for the gelatinizer, it was found out that the intended gel state could not be obtained by using one styrene block copolymer alone. Thus, two kinds of styrene block copolymers were used. It is presumed that the compatibility between the ester synthetic oil and the synthetic hydrocarbon oil improves and the amount of the oil separated from the gel is adjusted appropriately by using the two kinds of styrene block copolymers.

The compatibility between the base oil and the gelatinizer depends on the polarities thereof. A gelatinizer having a high polarity has a high compatibility with a base oil having a high polarity, whereas a gelatinizer having a low polarity has a low compatibility with the base oil having the high polarity. On the other hand, the gelatinizer having the low polarity has a high compatibility with a base oil having a low polarity, whereas the gelatinizer having the high polarity has a low compatibility with the base oil having the low polarity. One of the indexes expressing the polarity of a substance is the permittivity (dielectric constant). In general, a substance having a high permittivity has a high polarity. The styrene block copolymer such as SEPS and SEEPS is presumed to have a low permittivity because of its chemical structure having no polar group. Further, according to measurement of the permittivity of the base oil used in this embodiment, trioctyl trimellitate (TOTM) as the ester synthetic oil has the permittivity of 7.00 (F/m) and poly-α-olefin oil (PAO10) as the synthetic hydrocarbon oil has the permittivity of 3.06 (F/m). Namely, the permittivity of the ester synthetic oil (TOTM) was more than twice higher than the permittivity of the poly-α-olefin oil (PAO10). From this result, it is presumed that the ester synthetic oil (TOTM) having the high permittivity has a low compatibility with the styrene block copolymer expected to have a low permittivity and that the poly-α-olefin oil (PAO10) having the low permittivity has a high compatibility with the styrene block copolymer. Accordingly, in this embodiment, it is presumed that the gel state which is capable of realizing the moderate stickiness and discharging the oil (base oil) in an appropriate amount as well can be obtained by mixing the ester synthetic oil (TOTM) having the high permittivity with the poly-α-olefin oil (PAO10) having the low permittivity in a specific ratio, in a case that the styrene block copolymers such as SEPS and SEEPS which are expected to have the low permittivity are used as gelatinizer.

The gel lubricant related to this embodiment may further contain additives usually contained in the lubricant such as an extreme pressure additive, an antioxidant, a corrosion inhibitor (rust-preventing agent) and a metal deactivator. Especially, since the extreme pressure additive is capable of improving the wear resistance property of the rolling bearing and increasing the service life thereof without interfering with adequate separation of the oil from the gel in the gel lubricant related to this embodiment, the extreme pressure additive is preferably contained.

The extreme pressure additive is exemplified by an organophosphate compound, an organic metallic compound, and the like. As the organophosphate compound usable in this embodiment, orthophosphoric ester is preferred. The orthophosphoric ester includes, for example, trixylenyl phosphate, triphenyl phosphate, triethyl phosphate, tributyl phosphate, tris(2-ethylhexyl)phosphate, tridecyl phosphate, diphenylmono(2-ethylhexyl)phosphate, tricresyl phosphate, trioctyl phosphate, and trystearyl phosphate. Further, acid ester phosphate can be used in this embodiment. The acid ester phosphate includes, for example, methyl acid phosphate, isopropyl acid phosphate, butyl acid phosphate, 2-ethylhexyl acid phosphate, isodecyl acid phosphate, tridecyl acid phosphate, and lauryl acid phosphate. Furthermore, phosphorous acid esters can be used in this embodiment. The phosphorous acid esters include, for example, trioctyl phosphite, triphenyl phosphite, tricresyl phosphite, bis-2-ethylhexyl phosphite, tridecyl phosphite, dibutyl hydrogen phosphite, tris(nonylphenyl)phosphite, dilauryl hydrogen phosphite, diphenyl monodecyl phosphite, trilauryl trithio phosphite, and diphenyl hydrogen phosphite. The organic metallic compound includes, for example, an organic molybdenum compound and the like. The organic molybdenum compound adsorbs on a metallic surface of the bearing to function as a film formed on the metallic surface, thereby making it possible to suppress any seizure and to improve the load capacity and wear resistance of the bearing even under high-load and/or low-velocity.

The above extreme pressure additives may be used individually, or combining two or more kinds. The appropriate blending amount of the extreme pressure additive is in a range of 0.2% by mass to 5% by mass with respect to the total amount of the lubricant, and preferably in a range of 1% by mass to 2% by mass. In a case that the blending amount of the extreme pressure additive is less than 0.2% by mass, the effect obtained by adding the extreme pressure additive is insufficient. In a case that the blending amount of the extreme pressure additive exceeds 5% by mass, the generated amount of corrosive gas increases, which is not preferred.

The antioxidant is exemplified by a phenolic compound and an aromatic amine compound. Examples of the antioxidant include, for example, a phenol antioxidant such as 2,6-di-t-butyl-4-methylphenol and an amine antioxidant such as p,p'-dioctyl diphenylamine. One of the above antioxidants may be used individually, or two or more kinds of the above antioxidants may be used in combination. The blending amount of the antioxidant is suitably in a range of 0.5% by mass to 5% by mass.

The corrosion inhibitor is exemplified by a succinic acid compound. As the succinic acid compound, alkenyl succinic acid or anhydride thereof is preferred. The alkenyl succinic acid also satisfactorily adsorbs on a rolling surface and/or a sliding surface of the bearing material to form a thin film. Further, a succinic acid derivative also has the function similar to that of the succinic acid compound. The succinic acid derivative includes, for example, succinic acid, alkyl succinic acid, alkyl succinic acid half ester, alkenyl succinic acid, alkenyl succinic acid half ester, and succinic acid imide. The above succinic acid derivatives may be used individually or in combination. The metal deactivator includes, for example, benzotriazole, benzimidazole and indazole.

The gel lubricant related to this embodiment preferably contains no thickener, due to the reason that the thickener is aggregated and solidified in the lubricant in some cases, and great torque variation is caused when the lubricant containing the thickener is used for the rolling bearing. Further, since the gel lubricant related to this embodiment can obtain sufficient stickiness by using the gelatinizer, there is no need to contain the thickener. In this embodiment, the term "thickener" means a substance which is used in a conventional grease lubricant and which turns the lubricant into the semi-solid state; the thickener is different from the gelatinizer described above. The thickener, which is preferably not included in the gel lubricant related to this embodiment, includes, for example, a metallic soap thickener such as lithium soap and calcium soap and a non-metallic soap thickener such as a urea compound, silica gel, and bentonite.

The gel lubricant related to this embodiment can be prepared, for example, by uniformly mixing the base oil containing the ester synthetic oil and the synthetic hydrocarbon oil, the two kinds of styrene block copolymers, and other additive(s) as necessary, according to any conventionally known method at an appropriate temperature.

As described above, the gel lubricant related to this embodiment has adequate stickiness and causes the oil (base oil) to be discharged in an appropriate amount for a long period of time. By using the gel lubricant related to this embodiment in a rolling bearing, the rolling bearing can be stably driven for a long period of time at a low torque while having a small torque variation.

<Second Embodiment>

In a second embodiment of the present invention, an explanation will be made about a rolling bearing in which the gel lubricant related to the first embodiment is enclosed. A rolling bearing 11 related to the second embodiment as shown in FIG. 1 is mainly composed of a cylindrical outer race 1 of which central axis is a rotational axis m; a cylindrical inner race 2 which is provided coaxially with the outer race 1 on the inner circumferential side of the outer race 1; balls 3 as a plurality of rolling elements which are arranged in a raceway 6 formed between the outer race 1 and the inner race 2; a retainer 4 which is arranged in the raceway 6 to retain the balls 3; seals 5 which extend to the inner race 2 from both end portions of a raceway surface 1a of the outer race 1 facing the inner race 2 and which seal the raceway 6 from the outside; and the gel lubricant (not shown) related to the first embodiment which is enclosed in the raceway 6. In the rolling bearing 11, the friction resistance is reduced by rolling contact between the outer and inner races 1, 2 and the balls 3, and the rolling of the balls 3 causes the inner race 2 to rotate relative to the outer race 1 with the rotational axis m as the center. Each of the balls 3 is retained by the retainer 4 with a predetermined spacing distance in the circumferential direction of the outer and inner races 1, 2, thereby suppressing any drop or fall of the ball and any contact between the balls 3. Further, the gel lubricant reduces the friction resistance between the balls 3 in the raceway 6 and the races 1, 2 in the rolling bearing 11, thereby reducing the friction torque and suppressing the generation of friction heat, and consequently promoting the smooth rotations of the outer race 1 and the inner race 2.

Figure 2:
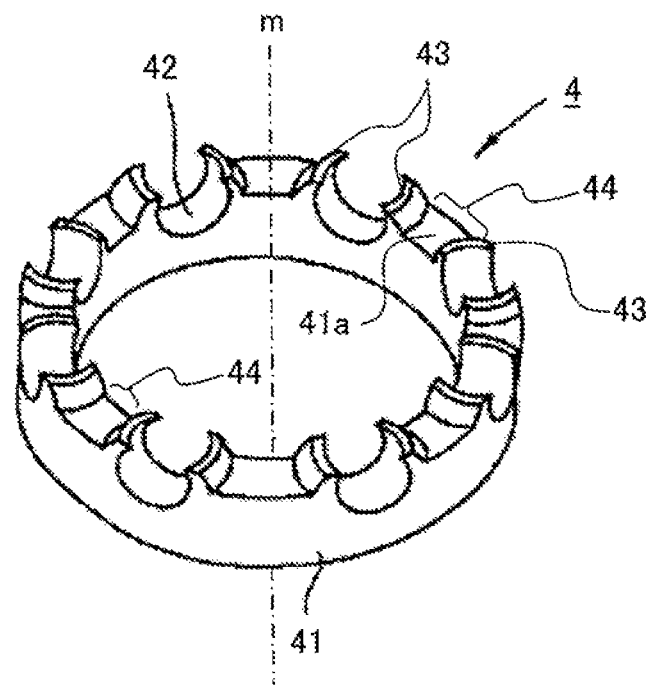
FIG. 2 is a view of a retainer (first example) used for the rolling bearing according to the second embodiment.

A crown retainer 4 shown in FIG. 2 can be used as a first example of the retainer 4 used in this embodiment. The retainer 4 includes a cylindrical annular member 41 having the rotational axis m as the center. The annular member 41 includes an outer circumferential surface and an inner circumferential surface parallel to the rotational axis m and two end surfaces 41a which connect the outer circumferential surface with the inner circumferential surface and which are substantially perpendicular to the rotational axis m. A plurality of pockets 42 for accommodating the balls 3 rotatably are formed in one of the end surfaces 41a of the annular member 41, with a predetermined spacing distance between the pockets 42 in the circumferential direction centered on the rotational axis m. The annular member 41 further includes a pair of claws 43, extending from one of the end surfaces 41a in the direction of the rotational axis m, at both end portions of each of the pockets 42. The pair of claws 43 are curved to approach to each other following the curved surface of the ball 3 accommodated in each of the pockets 42, thereby making it possible to prevent the ball 3 falling from the pocket 42. One of the end surfaces 41a of the retainer 4 related to this embodiment is provided with lubricant retaining portions 44 located between two adjacent pockets 42 and corresponding to a space defined between two adjacent claws 43, so that the gel lubricant can be retained in each of the lubricant retaining portions 44. The gel component of the gel lubricant is retained by the lubricant retaining portions 44, and the oil film which is composed only of the oil separated from the gel is formed on the surface of each ball 3. Therefore, the rolling bearing 11 is capable of rotating at a low torque while reducing the torque variation.

Figure 3:
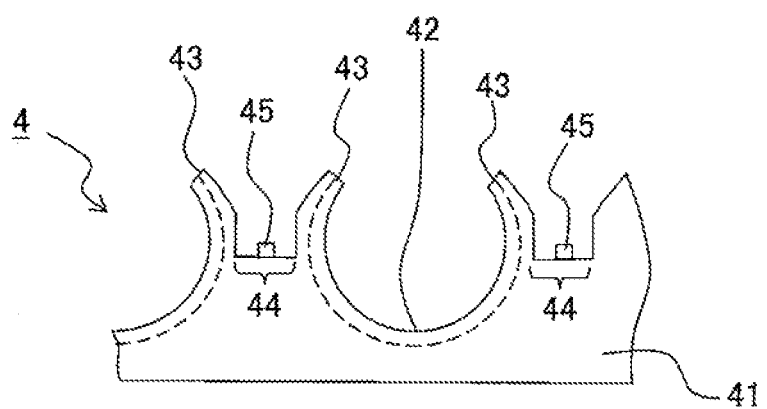
FIG. 3 is a partially enlarged view of a modification of the retainer (first example) used for the rolling bearing according to the second embodiment.
Figure 4:
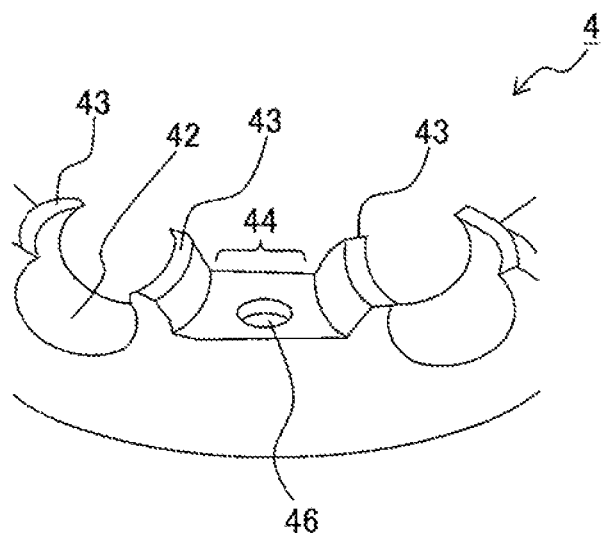
FIG. 4 is a partially enlarged view of another modification of the retainer (first example) used for the rolling bearing according to the second embodiment.

As shown in FIG. 3, the retainer 4 used in this embodiment may include a protrusion (convex portion) 45 on the surface of the lubricant retaining portion 44 sandwiched between claws 43 adjacent to each other. As shown in FIG. 4, a recess (concave portion) 46 may be formed in the surface of the lubricant retaining portion 44 sandwiched between claws 43 adjacent to each other. The recess or protrusion provided in the lubricant retaining portion 44 sandwiched between the adjacent claws 43 enables to retain the gel lubricant more efficiently in each of the lubricant retaining portions 44.

Figure 5:
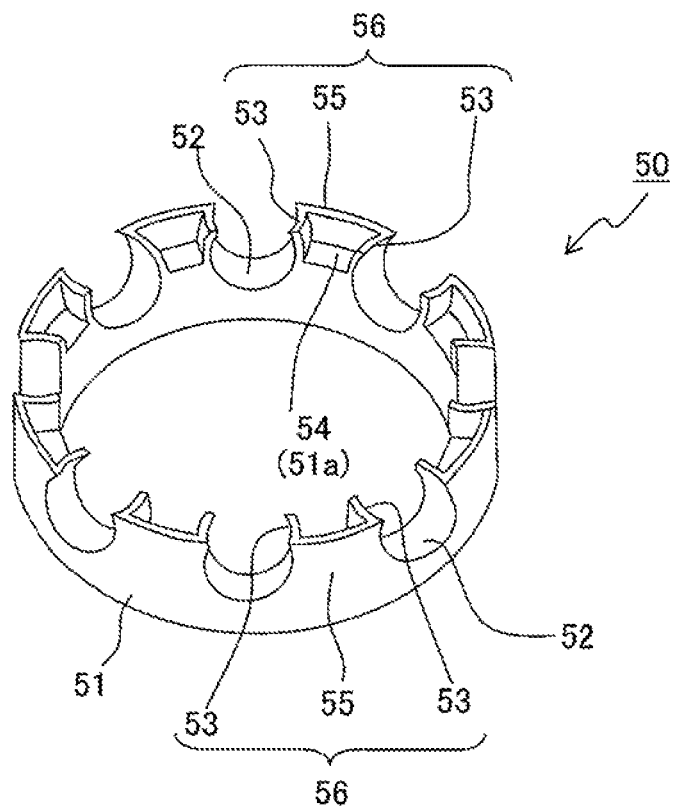
FIG. 5 is a view of a retainer (second example) used for the rolling bearing according to the second embodiment.
Figure 6:
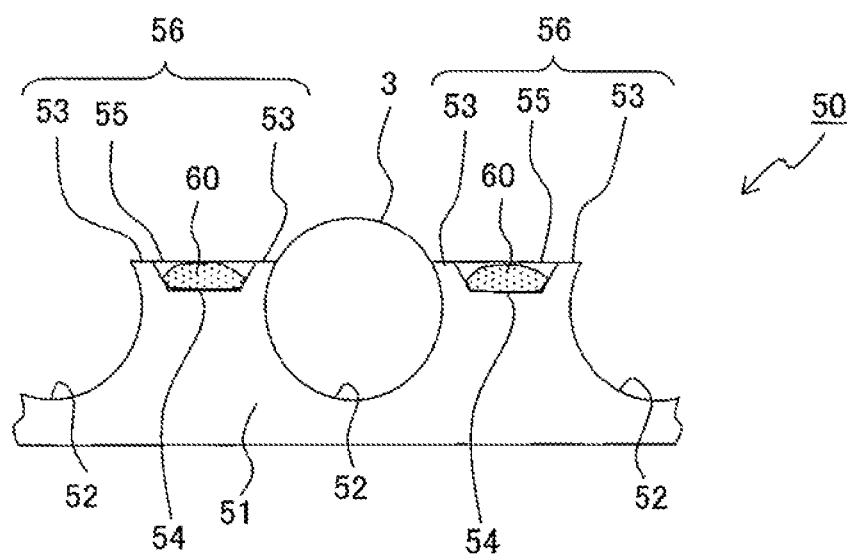
FIG. 6 is a partially enlarged sectional view of the retainer (second example) shown in FIG. 5.

In this embodiment, a retainer 50 shown in FIGS. 5 and 6 can be used as a second example, instead of the retainer 4 (first example). Similar to the retainer 4 as described above, the retainer 50 includes an annular member 51, a plurality of pockets 52 accommodating or receiving the balls 3 rotatably are formed in one of end surfaces 51a of the annular member 51 with a predetermined spacing distance between the pockets 52, and each of the pockets 52 is provided with a pair of claws 53. One of the end surfaces 51a of the retainer 50 is provided with lubricant retaining portions 54 each of which is defined between two adjacent pockets 52, as a space between two claws 53 belonging to two different pairs of claws 53 and adjacent to each other. The adjacent claws 53 belonging to two adjacent pairs of claws 53 and forming the lubricant retaining portion 54 are connected to each other by an outer circumferential wall 55 formed on the outer circumferential side of the retainer 50. The circumference of each of the lubricant retaining portions 54, except a portion on the inner circumferential side, is surrounded by a circumferential wall 56 formed of the outer circumferential wall 55 and the claws 53 belonging to two different pairs of claws 53 and adjacent to each other.

The retainer also rotates with the rotational axis m as the center (see FIG. 1) when the rolling bearing is driven. Gel lubricant 60 (see FIG. 6) retained in the lubricant retaining portion 54 is subjected to the centrifugal force generated by the rotation of the retainer. In the retainer 50 shown in FIG. 6, the circumferential walls 56, especially the outer circumferential walls 55, can prevent the gel lubricant 60 from flowing to the outer circumferential side and entering to the rolling surface of the rolling element (ball) 3. Since the oil (base oil) in the gel lubricant 60 contributing to the lubrication flows out due to the heat generated by the rotation and/or flows over the circumferential walls 56 due to the centrifugal force generated by the rotation, the oil (base oil) is thus conveniently supplied to the rolling element.

Figure 7:
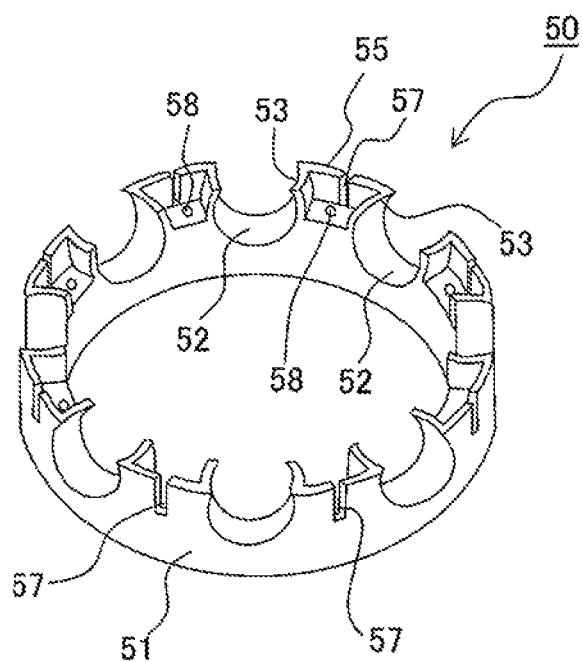
FIG. 7 is a view of a modification of the retainer (second example) used for the rolling bearing according to the second embodiment.

As shown in FIG. 7, the retainer 50 used in this embodiment may include a slit 57 formed in the outer circumferential wall 55 in a direction parallel to the rotational axis m. By providing the slit 57, only the oil (base oil) flows through the slit 57 and it is easily supplied from the lubricant retaining portion 54 to the outer race 1 and consequently to the rolling element (ball) 3. Accordingly, the lubricity can be further enhanced and the rolling bearing can be maintained with a longer service life while preventing the scattering of gel lubricant with the circumferential walls 56 and thus preventing the increase in torque. Further, as shown in FIG. 7, a protrusion 58 similar to the protrusion 45 may be provided in each of the lubricant retaining portions 54 of the retainer 50. By providing the protrusions 58, the gel lubricant is efficiently retained by each of the protrusions 58 even in a case that the gel lubricant is being subjected to the centrifugal force when the rolling bearing is driven. The protrusions 58 are particularly effective in a case that the amount of the gel lubricant is small.

In this embodiment, the fill amount of the gel lubricant is preferably about 5% to 30% of the total volume of the space inside of the bearing 11. Especially, in a pivot assembly bearing required to have a low torque, the fill amount of the gel lubricant is more preferably 5% to 10% of the total internal volume. By making the filling amount of the gel lubricant within this range, the gel lubricant sufficiently lubricates the outer and inner races 1, 2 and the balls 3 in the raceway 6 of the rolling bearing 11 to reduce the friction resistance, thereby making it possible to decrease the friction torque. In this context, the term "total volume of the space inside the bearing 11" means the volume of the space formed between the outer race 1 and the inner race 2 and separated from the outside by the seals 5, excluding the volumes of the balls 3 and the retainer 4.

As described above, in the rolling bearing 11 related to this embodiment, the gel component included in the gel lubricant is retained by each of the lubricant retaining portions 44 (54) of the retainer 4 (50), and only the appropriate amount of oil separated from the gel component is continuously supplied to the outer and inner races 1, 2 and the balls 3. Accordingly, the rolling bearing 11 related to this embodiment has a low torque and a long service life. Further, the gel component of the gel lubricant is remained in the retainer 4 (50), and thus there is no possibility that the gel component enters between the races 1, 2 and each ball 3 to increase the torque. The rolling bearing 11 related to this embodiment has small torque variation even after a long period of use and is less likely to cause lock due to the aggregation.

The rolling bearing 11 related to this embodiment is particularly excellent as the lubricant for the pivot assembly bearing. The torque variation of the rolling bearing 11 related to this embodiment is small, and thus the rolling bearing 11 can accurately position the magnetic head. Further, since the torque value itself is also small, the response speed of the magnetic head is fast. Although the rolling bearing 11 related to this embodiment is used suitably for the pivot assembly bearing, the use of the present invention is not limited to this application. The rolling bearing 11 related to the present embodiment can be used in all motors in which a small diameter bearing such as a fan motor and a stepping motor is used and a low torque is needed.

<Third Embodiment>

In a third embodiment of the present invention, an explanation will be made about a pivot assembly bearing provided with the rolling bearing related to the second embodiment and a hard disk drive (HDD) including the pivot assembly bearing.

Figure 8:
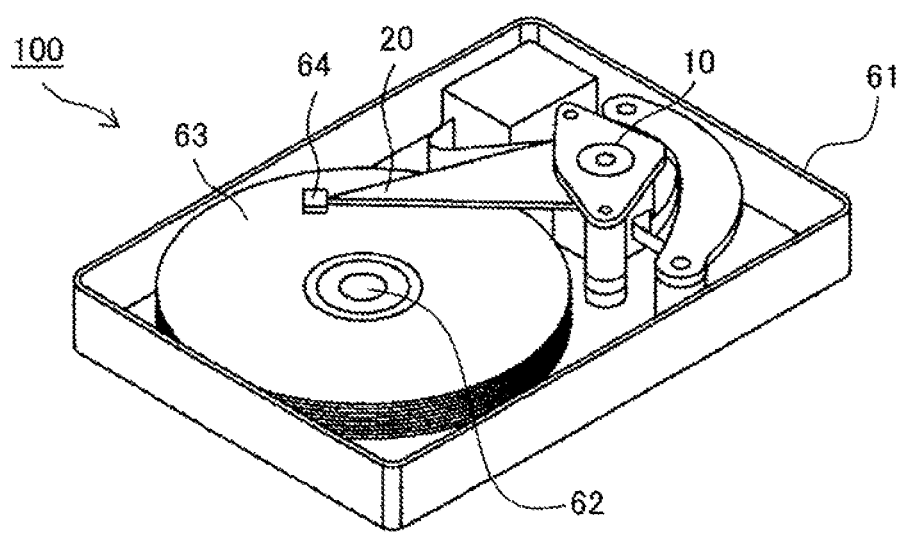
FIG. 8 is a view of a hard disk drive according to a third embodiment of the present invention.

As shown in FIG. 8, a hard disk drive 100 related to this embodiment is mainly composed of a base (base plate) 61 having a box-like rectangular shape; a spindle motor 62 provided on the base 61; a magnetic disk 63 rotated by the spindle motor 62; a swing arm 20 having a magnetic head 64 which writes and reads information in/from the magnetic disk 63; and a pivot assembly bearing 10 which swingably supports the swing arm 20.

Figure 9:
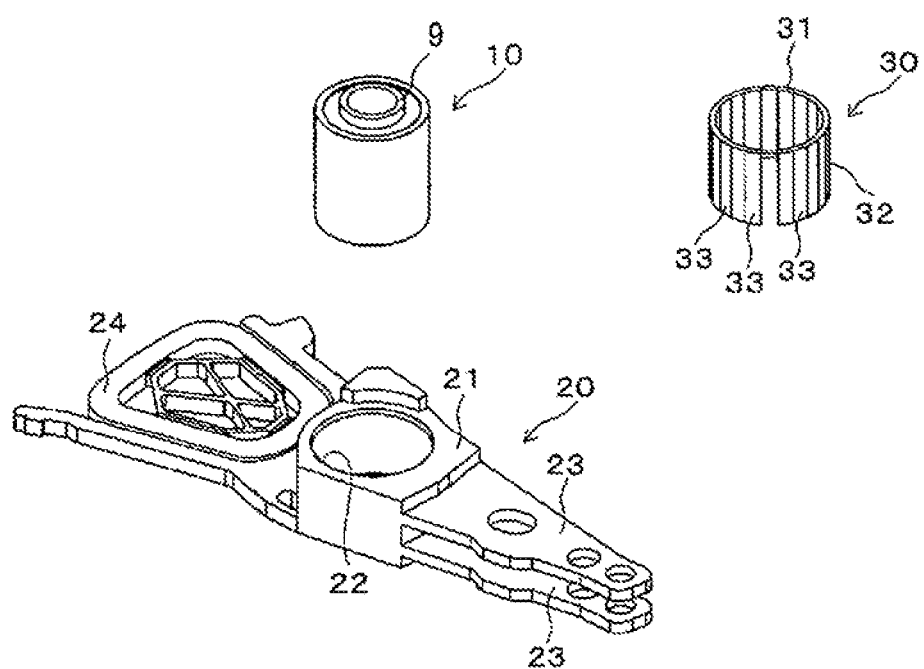
FIG. 9 is a view of a swing arm used for the hard disk drive according to the third embodiment.

As shown in FIG. 9, a mounting hole 22 through which the pivot assembly bearing 10 is mounted is formed in a base portion 21 of the swing arm 20. Arms 23 extend from the base portion 21. Although a pair of arms 23 is shown as an example in FIG. 9, the number of arms is not limited to this and depends on the number of disks. The magnetic head 64, which writes and reads the information in the hard disk drive 100, is attached to the front end portion of the pair of arms 23. A support portion 24 extending in a direction opposite to the pair of arms 23 is provided in the base portion 21. The swing arm 20 swingably moves when the support portion 24 is driven by a driving mechanism provided on the hard disk drive 100.

A tolerance ring 30 is inserted into the mounting hole 22 of the swing arm 20, and the pivot assembly bearing 10 is pressed into the inner side of the tolerance ring 30. The tolerance ring 30 is made of metal and includes a ring 31 and a pressing portion 32 extending from the ring 31 axially. The pressing portion 32 is formed of a plurality of rectangular pieces 33 and is provided with one portion, in the circumferential direction, at which no rectangular piece 33 is provided. A protrusion (convex portion; not shown) protruding in the radial direction is provided in each of the rectangular pieces 33. In a case that the pivot assembly bearing 10 is pressed into the tolerance ring 30, the tolerance ring 30 enlarges such that the protrusion of each of the rectangular pieces 33 is pressed against the inner circumferential surface of the mounting hole 22. Accordingly, the pivot assembly bearing is fixed to the mounting hole 22. Although the pivot assembly bearing 10 is attached to the swing arm 20 via the tolerance ring 30 in this embodiment, the pivot assembly bearing 10 may be attached directly to the swing arm 20 by being fixed with an adhesive, screws, and the like, without using the tolerance ring 30.

Figure 10:
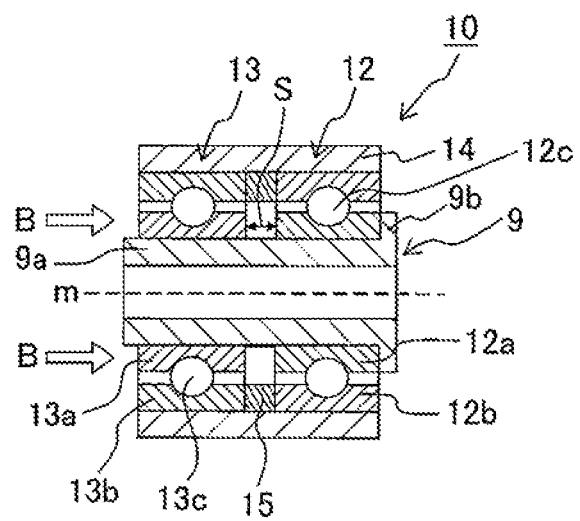
FIG. 10 is a cross-sectional view of an exemplary pivot assembly bearing according to the third embodiment.

As shown in FIG. 10, a pivot assembly bearing (bearing device) 10 is mainly composed of a shaft 9; two rolling bearings corresponding to a first bearing 12 and a second bearing 13 fitted into the shaft 9 with a space S of a predetermined length intervening therebetween; an annular spacer 15 which is provided in the space S and contacts the first and second bearings 12, 13; and a sleeve 14 (outer circumferential member) fitted to the outer circumferential surfaces of the first and second bearings 12, 13. The rolling bearing related to the second embodiment is used for the first and second bearings 12, 13. The first bearing 12 is mainly composed of a first inner race 12a; a first outer race 12b; balls 12c as a plurality of rolling elements which are arranged in a raceway formed between the first inner race 12a and the first outer race 12b; a retainer (not shown) which is arranged in the raceway to retain the balls 12c; a seal (not shown) which seals off the raceway from the outside; and the gel lubricant (not shown) related to the first embodiment which is enclosed in the raceway. Similar to the first bearing 12, the second bearing 13 is mainly composed of a second inner race 13a; a second outer race 13b; balls 13c as a plurality of rolling elements which are arranged in a raceway formed between the second inner race 13a and the second outer race 13b; a retainer (not shown) which is arranged in the raceway to retain the balls 13c; a seal (not shown) which seals off the raceway from the outside; and the gel lubricant (not shown) related to the first embodiment which is enclosed in the raceway. The shaft 9 includes a cylindrical shaft body 9a and a flange 9b formed on the side of one end of the shaft body 9a, and the shaft 9 is mounted on the base 61 so that the flange 9b is positioned on the side of the base 61 (see FIG. 8). One end portion of the first inner race 12a of the first bearing 12 contacts the flange 9b of the shaft 9.

As shown in FIG. 10, the pivot assembly bearing 10 related to this embodiment is assembled while being applied with preload in the direction of arrows B so as to eliminate any internal clearance in the direction of the rotational axis m. For example, the first outer race 12b is slidably fitted into the inner surface of the sleeve 14 and each of the first and second outer races 12b, 13b is fixed with the adhesive in a state that the spacer 15 is inserted into the space S between the first and second outer races 12b, 13b, and the first inner race 12a is fixed to the shaft 9 with the adhesive in a state that the first inner race 12a is made to contact the flange 9b. Then, the second inner race 13a is slidably fitted into the shaft 9, and then the outer end of the second inner race 13a is subjected to the preload by applying a load in the direction of the arrows B as shown in FIG. 10. The second inner race 13a is fixed to the shaft 9 with the adhesive in a state that the second inner race 13a is subjected to the preload so as to eliminate any internal clearance in the direction of the rotational axis m. Since the space S is maintained by the spacer IS when applying the preload to the second inner race 13a, the contact between the first and second bearings 12, 13 can be prevented and a preload amount can be adjusted over a large area.

Figure 11:
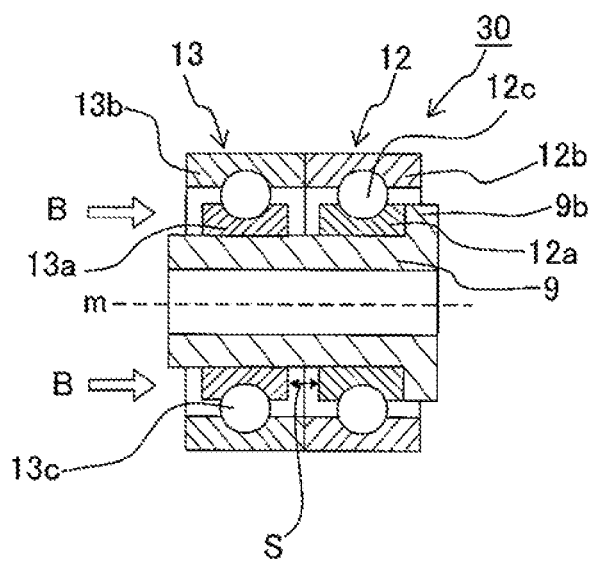
FIG. 11 is a cross-sectional view of another exemplary pivot assembly bearing according to the third embodiment.

In this embodiment, a pivot assembly bearing 30, as shown in FIG. 11, in which the sleeve 14 and the spacer 15 are eliminated may be used, instead of the pivot assembly bearing 10 shown in FIG. 10. A first outer race 12b and a second outer race 13b of the pivot assembly bearing 30 are designed to have the same size or dimension. The width dimension of each of first and second inner races 12a, 13a in the direction of the rotational axis m is smaller than the width direction of each of the first and second outer races 12b, 13b. Both sides of each of the first and second inner races 12a, 13a in the rotational axis m direction are shortened with each of the balls (rolling elements) 12c, 13c arranged in one of the first and second bearings 12, 13 as the center (reference). The first and second bearings 12, 13 are fitted into the shaft 9 in a state that the first outer race 12b contacts the second outer race 13b, and that one end portion of the first inner race 12a contacts the flange 9b of the shaft 9.

In the pivot assembly bearing 30 shown in FIG. 11, the first and second outer races 12b, 13b are retained in a state that the first outer race 12b contacts the second outer race 13b, and the first inner race 12a is fixed to the shaft 9 with the adhesive. Afterwards, the second inner race 13a is slidably fitted into the shaft 9, and then the outer end of the second inner race 13a is subjected to the preload by applying a load in the direction of arrows B as shown in FIG. 11. The second inner race 13a is fixed to the shaft 9 with the adhesive in a state that the preload is being applied so as to eliminate any internal clearance in the direction of the rotational axis m.

In the pivot assembly bearing 30 constructed as described above, the width dimension of the first and second inner races 12a, 13a is smaller than the width dimension of the first and second outer races 12b, 13b. Thus, a space S is formed between the first and second inner races 12a, 13a even when the first and second rolling bearings 12, 13 are brought in contact with each other. Therefore, in a case that the preload is applied to the second inner race 13a, the amount of preload can be adjusted over a wide range. Further, since the spacer 15 can be eliminated, it is possible to shorten the width dimension of the entire bearing device 30 to the extent corresponding to the eliminated spacer 15, in the direction of the rotational axis m. Consequently, the thickness dimension of the pivot part of the swing arm 20 is shortened to realize a thin hard disk drive 100. In addition, since the pivot assembly bearing 30 has no sleeve 14, the pivot assembly bearing 30 has a smaller number of components and can lower the cost.

The first and second bearings 12, 13 as the rolling bearings filled with the gel lubricant of the first embodiment are used for the pivot assembly bearings 10, 30 related to this embodiment. Although a rolling bearing generally rotates in one direction, each of the pivot assembly bearings 10, 30 performs an oscillating motion repeatedly rotating in forward and reverse direction at a very small angle and at a high speed so as to move the magnetic head 64 of the hard disk drive 100 on the magnetic disk 63. The magnetic head 64 is required to be moved to an accurate position at a high response speed. Even under such a severe driving condition, the gel lubricant used in this embodiment has enough stickiness to be retained on the retainer and is capable of continuously discharging an appropriate amount of oil from the gel so as to supply the oil to the balls and the inner and outer races. As a result, in the hard disk drive 100 related to this embodiment, the rolling bearings 12, 13 can be stably driven at a low torque with a small torque variation, thus realizing the accurate positioning and quicker response for the magnetic head.

EXAMPLES

The present invention will be explained specifically with the following examples. However, the present invention is not limited to the following examples.
[Preliminary Experiments]
Preliminary experiments (I) to (III) which will be explained below were performed by using an ester synthetic oil and a synthetic hydrocarbon oil as the base oil and styrene block copolymer(s) as the gelatinizer. Results of the preliminary experiments (I) to (III) are shown in TABLE 1.
[Preliminary Experiment(I)]
As shown in TABLE 1, each of gelatinizers containing one of styrene block copolymers was added to each of base oils containing one of the ester synthetic oil and the synthetic hydrocarbon oil, and they were mixed uniformly while being heated to a temperature of 220 degrees Celsius to prepare Samples 1 to 4. The gelation and oil separation of each of Samples 1 to 4 were observed based on the following observation method. Each of the gelatinizers was added to each of the base oils in an amount of about 4% by mass to 9% by mass with respect to the total amount of the base oil.
[Preliminary Experiment (II)]
As shown in TABLE 1, each of the gelatinizers containing one kind of the styrene block copolymers was added to a base oil obtained by mixing two kinds of oils (i.e., the ester synthetic oil and the synthetic hydrocarbon oil), and they were mixed uniformly while being heated to a temperature of 220 degrees Celsius to prepare Samples 5 and 6. The gelation and oil separation of each of Samples 5 and 6 were observed based on the following observation method. Each of the gelatinizers was added in an amount of about 2% by mass to 6% by mass with respect to the total amount of the base oil. The mixing ratio of the two kinds of oils (the ester synthetic oil and the synthetic hydrocarbon oil) in the base oil was made to be 1:1 in the mass ratio (ester synthetic oil:synthetic hydrocarbon oil=1:1).
[Preliminary Experiment (III)]
As shown in TABLE 1, a gelatinizer obtained by mixing two kinds of the styrene block copolymers was added to a base oil obtained by mixing two kinds of the oils (i.e., the ester synthetic oil and the synthetic hydrocarbon oil), and they were mixed uniformly while being heated to a temperature of 220 degrees Celsius to a prepare Sample 7. The gelation and oil separation of Sample 7 were observed based on the following observation method. The gelatinizers were added in an amount of about 4% by mass to 5% by mass with respect to the total amount of the base oil. The mixing ratio of the two kinds of oils (the ester synthetic oil and the synthetic hydrocarbon oil) in the base oil was made to be 1:1 in the mass ratio (ester synthetic oil:synthetic hydrocarbon oil=1:1), and the mixing ratio of the two kinds of styrene block copolymers in the gelatinizer was made to be 3:2 in the mass ratio (SEPS:SEEPS=3:2).
[Observation Method]
At first, each of Samples 1 to 7 was prepared in a beaker and the presence or absence of gelation was judged visually. Subsequently, in a condition that (1) no separated oil was confirmed visually between the inner wall of the beaker and the gel and that (2) a small amount of oil adhered to the finger of the observer when the gel was touched with the finger, but no gel adhered to the finger, the gelled sample was considered to be in a "state that the separation amount of oil was appropriate". In a case that the separated oil was observed visually in (1) above, it was considered that the separation amount of oil was excessive. In a case that no oil adhered to the finger of the observer but the gel adhered to the finger in (2) above, it was considered that the separation amount of oil was insufficient.

TABLE 1

| Preliminary Experiments | Samples | Base oils | Gelatinizers | Observation result |
|---|---|---|---|---|
| I | 1 | TOTM*[1] | SEPS*[3] | Gelation was observed, but most of oil separated immediately. |
| | 2 | TOTM | SEEPS*[4] | Gelation was observed, but most of oil separated immediately. |
| | 3 | PAO10*[2] | SEPS | Gelation was observed, but oil did not separate. |
| | 4 | PAO10 | SEEPS | Gelation was observed, but oil did not separate. |
| II | 5 | TOTM PAO10 | SEPS | No gelation was observed, only oil viscosity increased. |
| | 6 | TOTM PAO10 | SEEPS | Gelation was observed, but most of oil separated mmediately. |
| III | 7 | TOTM PAO10 | SEPS SEEPS | Gelation was observed, and appropriate amount of oil separated. |

*[1]TOTM: Ester synthetic oil (trioctyl trimellitate)
*[2]PAO10: Synthetic hydrocarbon oil (produced by Exxon Mobil Corporation, poly-α-olefin oil, kinetic viscosity at a temperature of 100 degrees Celcius: 10 mm$^2$/s)
*[3]SEPS: styrene-(ethylene/propylene)-styrene block copolymer
*[4]SEEPS: styrene-(ethylene-ethylene/propylene)-styrene block copolymer From the results of the preliminary experiments (I) to (III), it was found that the base oil gelled sufficiently and an appropriate amount of oil separated (exuded) in the case of Sample 7 where the gelatinizer obtained by mixing two kinds of the styrene block copolymers was added to the base oil obtained by mixing two kinds of oils, i.e., the ester synthetic oil and the synthetic hydrocarbon oil. Therefore, when used for the rolling bearing. Sample 7 is expected to have good stickiness to be retained on the retainer of the rolling bearing and to discharge an appropriate amount of oil so that the oil can be supplied to the balls and the like.

On the other hand, each of Samples 1 to 4 obtained by adding a gelatinizer containing only one kind of styrene block copolymer to the base oil containing one of the ester synthetic oil and the synthetic hydrocarbon oil did not have characteristics required as the lubricant for the rolling bearing, such as the gelation and the appropriate amount of the separated oil. The possible reason for this result is that the compatibility between the ester synthetic oil (TOTM) and the styrene block copolymer (SEPS, SEEPS) was too low in Samples 1 and 2, and the compatibility between the synthetic hydrocarbon oil (PAO10) and the styrene block copolymer (SEPS, SEEPS) was too high in Samples 3 and 4. Further, Samples 5 and 6 obtained by adding a gelatinizer containing only one kind of styrene block copolymer to the base oil obtained by mixing the ester synthetic oil and the synthetic hydrocarbon oil did not have the characteristics required as the lubricant for the rolling bearing, such as the gelation and the appropriate amount of the separated oil.

Examples 1 to 18 and Comparative Examples 1 to 31

The base oils, the gelatinizers, and additives were mixed uniformly while being heated at a temperature of 220 degrees Celsius in accordance with the composition of the gel lubricant shown in TABLE 2, and thus samples (gel lubricants) of Examples 1 to 18 were respectively obtained. Similarly, the samples of Comparative Examples 1 to 30 were obtained in accordance with the composition of the gel lubricant shown in TABLE 3. Further, as Comparative Example 31, a urea grease lubricant which has been conventionally used in the pivot assembly bearing was prepared.

TABLE 2

Composition of gel lubricant

| | Base oils | | Gelatinizers SEPS*3:SEEPS*4 (blending ratio) | | | | | | Additives*5 | Blending ratio of base oils | |
|---|---|---|---|---|---|---|---|---|---|---|---|
| Examples | TOTM*1 | PAO10*2 | 3:2 | 2:3 | 1:4 | 4:1 | 5:0 | 0:5 | | TOTM | PAO10 |
| 1 | 36 | 54 | 5 | | | | | | 5 | 40 | 60 |
| 2 | 35.2 | 52.8 | 7 | | | | | | 5 | 40 | 60 |
| 3 | 46.5 | 46.5 | 2 | | | | | | 5 | 50 | 50 |
| 4 | 46 | 46 | 3 | | | | | | 5 | 50 | 50 |
| 5 | 44.5 | 44.5 | 6 | | | | | | 5 | 50 | 50 |
| 6 | 44 | 44 | 7 | | | | | | 5 | 50 | 50 |
| 7 | 43 | 43 | 9 | | | | | | 5 | 50 | 50 |
| 8 | 55.8 | 37.2 | 2 | | | | | | 5 | 60 | 40 |
| 9 | 55.2 | 36.8 | 3 | | | | | | 5 | 60 | 40 |
| 10 | 55.2 | 36.8 | | 3 | | | | | 5 | 60 | 40 |
| 11 | 55.2 | 36.8 | | | 3 | | | | 5 | 60 | 40 |
| 12 | 55.2 | 36.8 | | | | 3 | | | 5 | 60 | 40 |
| 13 | 52.8 | 35.2 | 7 | | | | | | 5 | 60 | 40 |
| 14 | 51.6 | 34.4 | 9 | | | | | | 5 | 60 | 40 |
| 15 | 64.4 | 27.6 | 3 | | | | | | 5 | 70 | 30 |
| 16 | 63.7 | 27.3 | 4 | | | | | | 5 | 70 | 30 |
| 17 | 61.6 | 26.4 | 7 | | | | | | 5 | 70 | 30 |
| 18 | 60.2 | 25.8 | | | | | 9 | | 5 | 70 | 30 |

*1TOTM: Ester synthetic oil (trioctyl trimellitate)
*2PAO10: Synthetic hydrocarbon oil (produced by Exxon Mobil Corporation, poly-α-olefin oil, kinetic viscosity at a temperature of 100 degrees celcius: 10 mm²/s)
*3SEPS: Styrene-(ethylene/propylene)-styrene block copolymer
*4SEEPS: Styrene-(ethylene-ethylene/propylene)-styrene block copolymer
*5Amine antioxidant (2.0% by mass), Benzotriazole metal deactivator (0.5% by mass), Succinic acid half ester corrosion inhibitor (0.5% by mass), Phosphoester extreme-pressure additive (2.0% by mass)

TABLE 3

Composition of gel lubricant

| | Base oils | | Gelatinizers SEPS*3:SEEPS*4 (blending ratio) | | | | | | Additives*5 | Blending ratio of base oils | |
|---|---|---|---|---|---|---|---|---|---|---|---|
| Comparative Examples | TOTM*1 | PAO10*2 | 3:2 | 2:3 | 1:4 | 4:1 | 5:0 | 0:5 | | TOTM | PAO10 |
| 1 | 0 | 90 | 5 | | | | | | 5 | 0 | 100 |
| 2 | 0 | 90 | | | | | 5 | | 5 | 0 | 100 |
| 3 | 18.4 | 73.6 | 3 | | | | | | 5 | 20 | 80 |
| 4 | 18.4 | 73.6 | | 3 | | | | | 5 | 20 | 80 |
| 5 | 18.4 | 73.6 | | | 3 | | | | 5 | 20 | 80 |
| 6 | 18.4 | 73.6 | | | | 3 | | | 5 | 20 | 80 |
| 7 | 18 | 72 | 5 | | | | | | 5 | 20 | 80 |
| 8 | 28.2 | 65.8 | 1 | | | | | | 5 | 30 | 70 |
| 9 | 27.6 | 64.4 | 3 | | | | | | 5 | 30 | 70 |
| 10 | 27 | 63 | 5 | | | | | | 5 | 30 | 70 |
| 11 | 26.7 | 62.3 | 6 | | | | | | 5 | 30 | 70 |
| 12 | 37.6 | 56.4 | 1 | | | | | | 5 | 40 | 60 |
| 13 | 33.6 | 50.4 | 11 | | | | | | 5 | 40 | 60 |
| 14 | 47 | 47 | 1 | | | | | | 5 | 50 | 50 |
| 15 | 42 | 42 | 11 | | | | | | 5 | 50 | 50 |
| 16 | 45 | 45 | | | | | 5 | | 5 | 50 | 50 |
| 17 | 45 | 45 | | | | | | 5 | 5 | 50 | 50 |
| 18 | 50.4 | 33.6 | 11 | | | | | | 5 | 60 | 40 |
| 19 | 58.8 | 25.2 | 11 | | | | | | 5 | 70 | 30 |
| 20 | 60.2 | 25.8 | | 11 | | | | | 5 | 70 | 30 |
| 21 | 60.2 | 25.8 | | | 11 | | | | 5 | 70 | 30 |
| 22 | 72 | 18 | 5 | | | | | | 5 | 80 | 20 |
| 23 | 67.2 | 16.8 | 11 | | | | | | 5 | 80 | 20 |
| 24 | 79.2 | 8.8 | 7 | | | | | | 5 | 90 | 10 |
| 25 | 75.6 | 8.4 | 11 | | | | | | 5 | 90 | 10 |
| 26 | 79.2 | 8.8 | | 7 | | | | | 5 | 90 | 10 |

TABLE 3-continued

Composition of gel lubricant

| Comparative Examples | Base oils | | Gelatinizers SEPS*3:SEEPS*4 (blending ratio) | | | | | | Additives*5 | Blending ratio of base oils | |
|---|---|---|---|---|---|---|---|---|---|---|---|
| | TOTM*1 | PAO10*2 | 3:2 | 2:3 | 1:4 | 4:1 | 5:0 | 0:5 | | TOTM | PAO10 |
| 27 | 79.2 | 8.8 | | | 7 | | | | 5 | 90 | 10 |
| 28 | 79.2 | 8.8 | | | | 7 | | | 5 | 90 | 10 |
| 29 | 90 | 0 | 5 | | | | | | 5 | 100 | 0 |
| 30 | 90 | 0 | | | | | | 5 | 5 | 100 | 0 |

*1 TOTM: Ester synthetic oil (trioctyl trimellitate)
*2 PAO10: Synthetic hydrocarbon oil (produced by Exxon Mobil Corporation, poly-α-olefin oil, kinetic viscosity at a temperature of 100 degrees celcius: 10 mm²/s)
*3 SEPS: Styrene-(ethylene/propylene)-styrene block copolymer
*4 SEEPS: Styrene-(ethylene-ethylene/propylene)-styrene block copolymer
*5 Amine antioxidant (2.0% by mass), Benzotriazole metal deactivator (0.5% by mass), Succinic acid half ester corrosion inhibitor (0.5% by mass), Phosphoester extreme-pressure additive (2.0% by mass)

Each of the samples in Examples 1 to 18 and Comparative Examples 1 to 30 was subjected to the evaluation of (a) stickiness and (b) amount of the separated oil in accordance with the following method. The urea grease lubricant in Comparative Example 31 was subjected only to the evaluation of (a) stickiness.

(a) Stickiness

Figure 12:
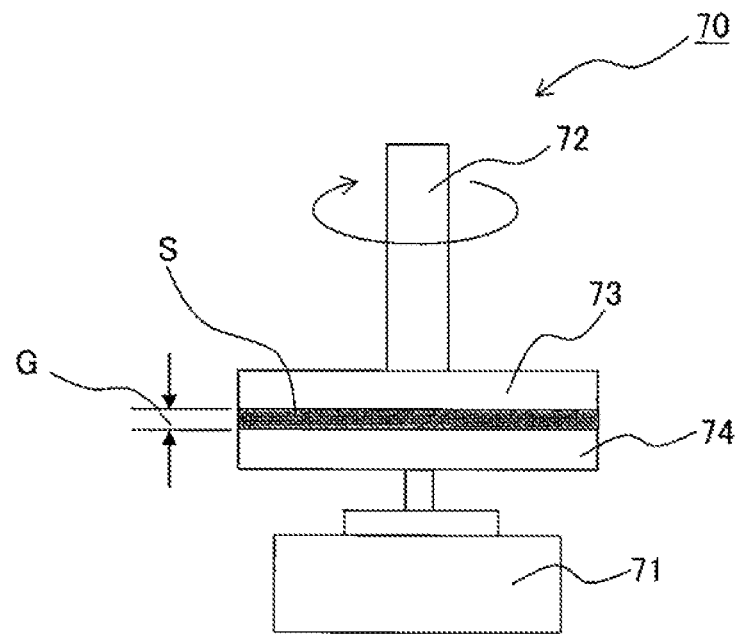
FIG. 12 is a view of a rotational rheometer used for the torque measurement in Examples.

Each of the samples in Examples 1 to 18 and Comparative Examples 1 to 31 was used to measure the torque by using a rotational rheometer 70 shown in FIG. 12. The rotational rheometer 70 is mainly composed of a torque meter 71, an upper rotational plate 73 which rotates with a rotational shaft 72 as the center, and a lower fixed plate 74. A gap G between the upper rotational plate 73 and the lower fixed plate 74 was set to 0.5 mm, and a sample S (gel lubricant) of each of Examples 1 to 18 and Comparative Examples 1 to 31 was sandwiched between the plates. After keeping the rotational rheometer 70 with each of the samples sandwiched between the plates in an environment of 25 degrees Celsius, the upper rotational plate 73 was rotated at a shear velocity of 0.5 s$^{-1}$ to measure the torque. The diameter of each of the upper rotational plate 73 and the lower fixed plate 74 used in the measurement was 20 mm.

The stickiness of each of the samples in Examples 1 to 18 and Comparative Examples 1 to 31 was evaluated based on the measured torque in accordance with the criterion indicated below.

<Evaluation Criterion for Stickiness>

+: Stickiness was suitable for the rolling bearing (torque was less than 3.5 mN·m).

±: Stickiness was usable for the rolling bearing (torque was 3.5 mN·m or more and less than 5 mN·m).

−: Stickiness was not suitable for the rolling bearing (torque was 5 mN·m or more).

Regarding the above evaluation criterion, the evaluation result "+" indicates that the measured torque was equivalent to or less than the torque in Comparative Example 31 where the conventional urea grease lubricant for the pivot assembly bearing was used, and that the stickiness of the sample was suitable for the rolling bearing. The evaluation result "±" indicates that the measured torque was less than about 1.5 times the value of the torque in Comparative Example 31 and that the stickiness of the sample was usable for the rolling bearing. The upper limit of the evaluation result "+" was determined in consideration of the variation range of torque, the performance value of a product, and the like in a case of using the conventional urea grease lubricant. The evaluation result "−" indicates that the measured torque was equivalent to or more than about 1.5 times the value of the torque in Comparative Example 31 and that the stickiness of the sample was not suitable for the rolling bearing. A sample which did not gelate, a sample which turned into the gel but most of the oil was separated immediately, and a sample of which oil was not separated at all were unsuitable for the lubricant of the rolling bearing, and thus the torque of such samples was not measured.

(b) Amount of Separated Oil

A constant-temperature storage test was performed wherein a predetermined amount of each of the samples in Examples 1 to 18 and Comparative Examples 1 to 30 was put in a beaker, and was kept for 168 hours under an environment of temperature: 60 degrees Celsius (plus or minus 1 degree Celsius) and relative humidity: 0%. After the constant-temperature storage test, the mass of balance of the gel lubricant after removal of the separated oil therefrom was measured by using a precision balance, and the difference in mass before and after the constant-temperature storage test was designated as the mass of the separated oil. The mass of the separated oil was divided by the mass of the gel lubricant at the time of start of the constant-temperature storage test, and the obtained value was designated as the amount of the separated oil (%). The temperature of the constant-temperature storage test was set to 60 degrees Celsius in consideration of the upper limit of operating temperature of a general pivot assembly bearing.

The amount of the separated oil of each of the samples in Examples 1 to 18 and Comparative Examples 1 to 30 was evaluated in accordance with the criterion indicated below.

<Evaluation Criterion for the Amount of Separated Oil>

+: The amount of the separated oil was 0.4% or more and less than 6%.

±: The amount of the separated oil was 0.15% or more and less than 0.4%, or was 6% or more and less than 10%.

−: The amount of the separated oil was less than 0.15% or 10% or more.

Regarding the above evaluation criterion, the evaluation result "+" indicates that the amount of oil separated from the gel lubricant was especially good. The evaluation result "±" indicates that the amount of oil separated from the gel lubricant was good. The evaluation result "−" indicates that the amount of oil separated from the gel lubricant was too small or too large. A sample which did not gelate, a sample which turned into the gel but most of the oil was separated immediately, and a sample of which oil was not separated at all were unsuitable for the lubricant of the rolling bearing, and thus the amount of the separated oil was not measured.

(c) Overall Evaluation

Overall evaluation was performed from the evaluation results of (a) stickiness and (b) amount of the separated oil in accordance with the criterion indicated below.

<Evaluation Criterion for Overall Evaluation>

+: The evaluation results of (a) and (b) were both "+".

±: The evaluation results of (a) and (b) were each "+" or "±", and the evaluation result of (a) or (b) was "±".

−: The evaluation result of (a) or (b) was "−", or no evaluation was performed in (a) or (b).

Regarding the above evaluation criterion, the evaluation result "+" indicates that the stickiness and the amount of the separated oil were especially good and that the sample was remarkably suitable for the lubricant used for the rolling bearing. The evaluation result "±" indicates that the stickiness and the amount of the separated oil were good and that the sample was suitable for the lubricant used for the rolling bearing. The evaluation result "−" indicates that the sample was unsuitable for the lubricant used for the rolling bearing.

The evaluation results of Examples 1 to 18 are shown in TABLE 4, the evaluation results of Comparative Examples 1 to 31 are shown in TABLE 5 and TABLE 6. Further, in FIG. 13 wherein the blending ratio of TOTM in the base oil is the horizontal axis and the blending amount of the gelatinizer is the vertical axis, symbols representing the overall evaluation results of "+", "±", "−" are placed at positions each representing the composition of the sample in one of Examples 1 to 18 and Comparative Examples 1 to 30. Noted that term "(n/a)" (not available) in TABLE 5 and TABLE 6 indicates that the evaluation or the measurement was not performed due to the reason described in the "Remarks".

TABLE 4

| Examples | Stickiness Torque (mN · m) | Stickiness Evaluation | Amount of separated oil (%) | Amount of separated oil Evaluation | Overall Evaluation | Remarks |
|---|---|---|---|---|---|---|
| 1 | 1.29 | + | 0.20 | ± | ± | |
| 2 | 4.51 | ± | 0.25 | ± | ± | |
| 3 | 0.52 | + | 0.42 | + | + | |
| 4 | 0.68 | + | 0.50 | + | + | |
| 5 | 0.98 | + | 0.40 | + | + | |

TABLE 4-continued

| Examples | Stickiness Torque (mN · m) | Stickiness Evaluation | Amount of separated oil (%) | Amount of separated oil Evaluation | Overall Evaluation | Remarks |
|---|---|---|---|---|---|---|
| 6 | 3.42 | + | 0.20 | ± | ± | |
| 7 | 4.59 | ± | 0.25 | ± | ± | |
| 8 | 1.85 | + | 0.17 | ± | ± | |
| 9 | 0.58 | + | 4.64 | + | + | |
| 10 | 0.95 | + | 1.78 | + | + | |
| 11 | 0.53 | + | 3.09 | + | + | |
| 12 | 0.35 | + | 1.80 | + | + | |
| 13 | 3.06 | + | 2.76 | + | + | |
| 14 | 3.83 | ± | 1.51 | + | ± | |
| 15 | 4.43 | ± | 0.30 | ± | ± | |
| 16 | 0.85 | + | 3.76 | + | + | |
| 17 | 0.92 | + | 2.07 | + | + | |
| 18 | 0.46 | + | 5.95 | + | + | |

TABLE 5

| Comparative Examples | Stickiness Torque (mN · m) | Stickiness Evaluation | Amount of separated oil (%) | Amount of separated oil Evaluation | Overall Evaluation | Remarks |
|---|---|---|---|---|---|---|
| 1 | (n/a) | (n/a) | (n/a) | (n/a) | − | No gelation |
| 2 | (n/a) | (n/a) | (n/a) | (n/a) | − | No gelation |
| 3 | 0.75 | + | 0.05 | − | − | |
| 4 | 0.88 | + | 0.12 | − | − | |
| 5 | 0.96 | + | 0.08 | − | − | |
| 6 | 0.85 | + | 14.48 | − | − | |
| 7 | 2.39 | + | 0.07 | − | − | |
| 8 | (n/a) | (n/a) | (n/a) | (n/a) | − | No gelation |
| 9 | 0.77 | + | 0.05 | − | − | |
| 10 | 1.25 | + | 0.04 | − | − | |
| 11 | 5.37 | − | 0.05 | − | − | |
| 12 | (n/a) | (n/a) | (n/a) | (n/a) | − | No gelation |
| 13 | 8.06 | − | 0.05 | − | − | |
| 14 | 2.52 | + | 0.07 | − | − | |
| 15 | 9.96 | − | 0.12 | − | − | |

TABLE 6

| Comparative Examples | Stickiness Torque (mN · m) | Stickiness Evaluation | Amount of separated oil (%) | Amount of separated oil Evaluation | Overall Evaluation | Remarks |
|---|---|---|---|---|---|---|
| 16 | (n/a) | (n/a) | (n/a) | (n/a) | − | No gelation |
| 17 | (n/a) | (n/a) | (n/a) | (n/a) | − | Gelation was observed, but most of oil separated immediately. |
| 18 | 6.22 | − | 1.00 | + | − | |
| 19 | 0.95 | + | 15.37 | − | − | |
| 20 | 6.59 | − | 15.46 | − | − | |
| 21 | 8.17 | − | 12.16 | − | − | |
| 22 | (n/a) | (n/a) | (n/a) | (n/a) | − | Gelation was observed, but most of oil separated immediately. |
| 23 | (n/a) | (n/a) | (n/a) | (n/a) | − | Gelation was observed, but most of oil separated immediately. |
| 24 | (n/a) | (n/a) | (n/a) | (n/a) | − | Gelation was observed, but most of oil separated immediately. |

TABLE 6-continued

| | Stickiness | | Amount of separated oil | | | |
|---|---|---|---|---|---|---|
| Comparative Examples | Torque (mN·m) | Evaluation | Amount of separated oil (%) | Evaluation | Overall Evaluation | Remarks |
| 25 | (n/a) | (n/a) | (n/a) | (n/a) | – | Gelation was observed, but most of oil separated immediately. |
| 26 | 2.58 | + | 15.20 | – | – | |
| 27 | 3.03 | + | 16.46 | – | – | |
| 28 | 2.09 | + | 12.54 | – | – | |
| 29 | (n/a) | (n/a) | (n/a) | (n/a) | – | Gelation was observed, but most of oil separated immediately. |
| 30 | (n/a) | (n/a) | (n/a) | (n/a) | – | Gelation was observed, but most of oil separated immediately. |
| 31 | 3.51 | (n/a) | (n/a) | (n/a) | (n/a) | Only stickiness was evaluated. |

As shown in TABLE 4, it was found out the gel lubricant in each of Examples 1 to 18 had a good stickiness and an appropriate amount of separated oil and was suitable for the lubricant used for the rolling bearing. The gel lubricant in each of Examples 1 to 18 included the base oil containing the ester synthetic oil (TOTM) and the synthetic hydrocarbon oil (PAO10) and the gelatinizer containing two kinds of styrene block copolymers (SEPS, SEEPS), wherein the mass ratio (X:Y) of the ester synthetic oil (X) to the synthetic hydrocarbon oil (Y) was 35:65 to 75:25 and the amount of gelatinizer contained in the gel lubricant was 1.5% by mass to 10% by mass. This range, namely the range in which the mass ratio (X:Y) of the ester synthetic oil (X) to the synthetic hydrocarbon oil (Y) is between 35:65 and 75:25, and the blending amount of the gelatinizer is in the range of 1.5% by mass to 10% by mass with respect to the total amount of the gel lubricant is shown in FIG. 13 as an area "a" surrounded by solid lines.

Figure 13:
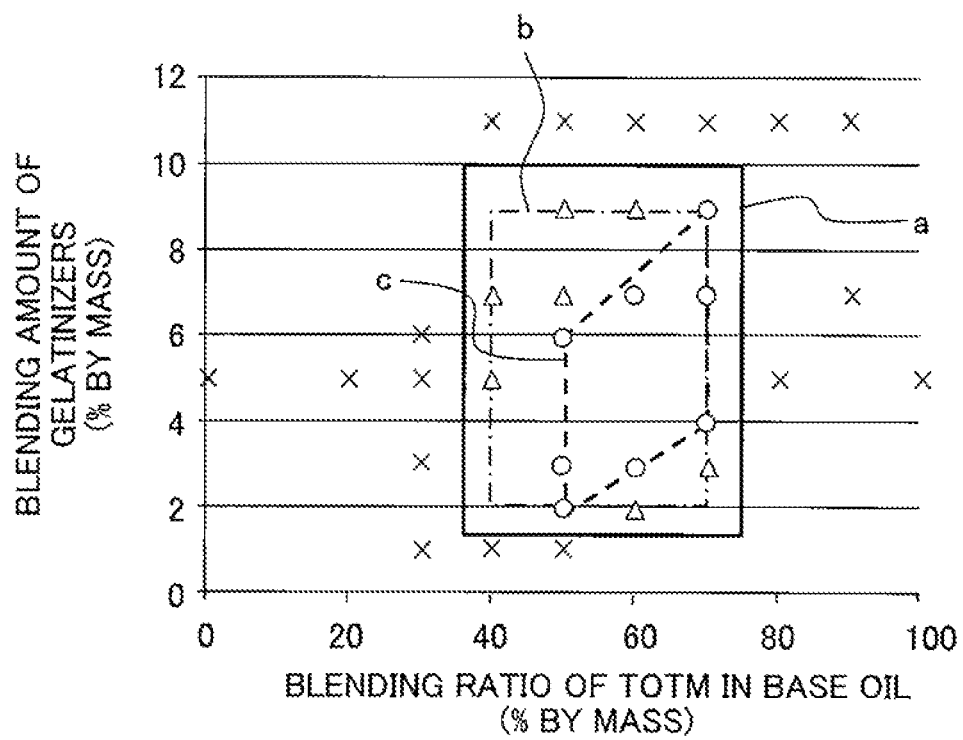
FIG. 13 shows the relationship between the composition of a gel lubricant and the overall evaluation of the gel lubricant in each of Examples.
Figure 14A:
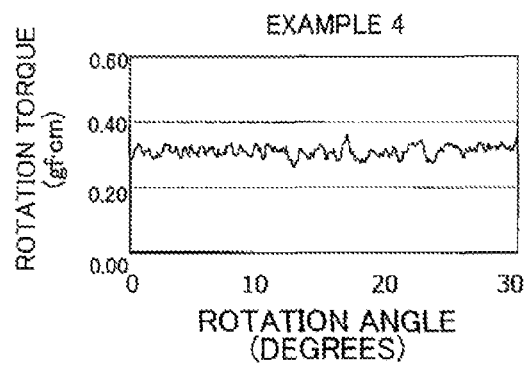
FIG. 14A shows the relationship between the rotation angle and the rotation torque of the pivot assembly bearing in Example 4.
Figure 14B:
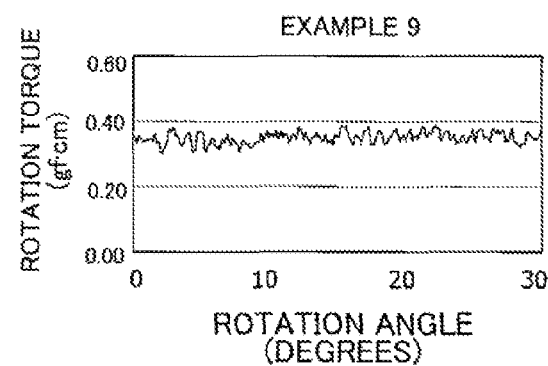
FIG. 14B shows the relationship between the rotation angle and the rotation torque of the pivot assembly bearing in Example 9.
Figure 14C:
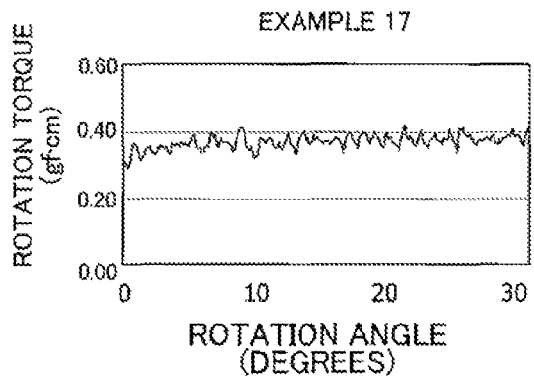
FIG. 14C shows the relationship between the rotation angle and the rotation torque of the pivot assembly bearing in Example 17.
Figure 14D:
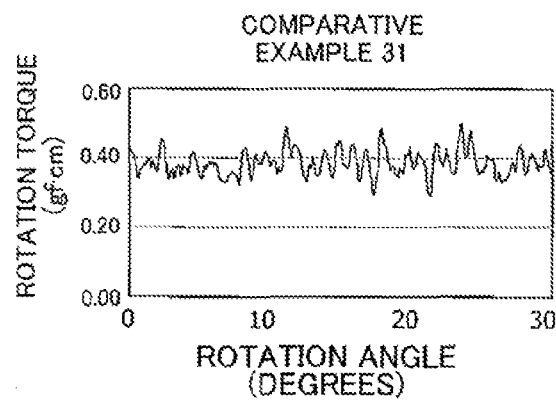
FIG. 14D shows the relationship between the rotation angle and the rotation torque of the pivot assembly bearing in Comparative Example 31.

The area "b" surrounded by dashed-dotted lines is shown within the area "a" of FIG. 13. The area "b" indicates the range in which the blending ratio of TOTM in the base oil is in a range of 40% by mass to 70% by mass, namely the mass ratio (X:Y) of the ester synthetic oil (X) to the synthetic hydrocarbon oil (Y) is 40:60 to 70:30, and the blending amount of the gelatinizer is in a range of 2% by mass to 9% by mass with respect to the total amount of the gel lubricant. Gel lubricants having the composition in the area "b" are suitable for the lubricant used for the rolling bearing.

The area "c" surrounded by a dashed line is shown within the area "b" of FIG. 13. Each of the gel lubricants having the composition in the area "c" was evaluated as "+" in the overall evaluation and is more preferred as the lubricant used for the rolling bearing. Namely, in FIG. 13 having the horizontal axis as the blending ratio of TOTM in the base oil and the vertical axis as the blending amount of the gelatinizer, gel lubricants having the composition in the area formed by connecting the first to fourth points by the dashed lines (area c) are more preferred as the lubricant used for the rolling bearing, the first point corresponding to the point which the mass ratio (X:Y) of the ester synthetic oil (X) to the synthetic hydrocarbon oil (Y) is 50:50 and the blending amount of the gelatinizer is 6% by mass, the second point corresponding to the point which the mass ratio (X:Y) is 50:50 and the blending amount of the gelatinizer is 2% by mass, the third point corresponding to the point which the mass ratio (X:Y) is 70:30 and the blending amount of the gelatinizer is 4% by mass, and the fourth point corresponding to the point which the mass ratio (X:Y) is 70:30 and the blending amount of the gelatinizer is 9% by mass.

In contrast, as shown in TABLE 5, TABLE 6, and FIG. 13, Comparative Examples 1 to 30 were evaluated as "–" in the overall evaluation and considered unsuitable for the lubricant used for the rolling bearing. Comparative Examples 1 to 30 did not satisfy one or both of the condition that the base oil contains the ester synthetic oil (TOTM) and the synthetic hydrocarbon oil (PAO10) with the mass ratio (X:Y) of the ester synthetic oil (X) to the synthetic hydrocarbon oil (Y) being within the range of 35:65 to 75:25 and the condition that the gelatinizer contains two kinds of styrene block copolymers (SEPS, SEEPS) with the blending amount of the gelatinizer being in a range of 1.5% by mass to 10% by mass with respect to the total amount of the gel lubricant.

(d) Measurement of Rotation Torque of Pivot Assembly Bearing

The gel lubricants in Example 4, Example 9, and Example 17 and the urea grease lubricant in Comparative Example 31 were each filled in the rolling bearing, and then the rotation torque was measured. The rolling bearing used for the measurement of the rotation torque was a bearing used for the pivot assembly bearing of the swing arm of the hard disk drive, and the rolling bearing used for the measurement had the same structure as the rolling bearing 11 of FIG. 1. At first, the initial exudation of oil was performed by filling the gel lubricant in the lubricant retaining portions 44 (see FIG. 2) of the retainer 4 as components of the rolling bearing 11 and then by performing heating at a temperature of 50 degrees Celsius for 30 minutes. Subsequently, the full rotation was continuously performed for about 2 minutes. Thereafter, the rotation was performed at a speed of 0.1 rpm and the rotation angle of 0 to 30 degrees, and the rotation torque in this rotation angle range was measured. The results of measurements are shown in FIGS. 14A to 14D.

In the gel lubricant of Examples 4, 9, and 17, the variation of the rotation torque was small as compared with the urea grease lubricant (Comparative Example 31) which has been conventionally used for the pivot assembly bearing. The average rotation torque in Comparative Example 31 was 0.38 gf·cm ($3.77 \times 10^{-5}$ N·m), whereas the average rotation torque in Example 4 was 0.31 gf·cm ($3.05 \times 10^{-5}$ N·m): the average rotation torque in Example 9 was 0.35 gf·cm ($3.43 \times 10^{-5}$ N·m); and the average rotation torque in Example 17 was 0.37 gf·cm ($3.63 \times 10^{-5}$ N·m). Accordingly, the average rotation torque of the gel lubricant in each of Examples 4, 9, and 17 was slightly smaller than that of the urea grease lubricant in Comparative Example 31.

The viscosity of the base oil of the urea grease lubricant in Comparative Example 31 was approximately 50 mm²/s, whereas the viscosity of the base oil of the gel lubricant in each of Examples 4, 9, and 17 was approximately 70 mm²/s to 85 mm²/s. Namely, despite that the viscosity of the base oil of the gel lubricant in each of Examples 4, 9, and 17 was higher than the viscosity of the base oil of the urea grease lubricant in Comparative Example 31, the average rotation torque of the gel lubricant in each of Examples 4, 9, and 17 was substantially equal to (slightly lower than) the average rotation torque of the urea grease lubricant in Comparative Example 31. This result means that the gel lubricant in each of Examples 4, 9, and 17 has a smaller resistance as the lubricant than that of the urea grease lubricant in Comparative Example 31.

Although the gel lubricant according to the present invention was specifically explained, the present invention is not limited to Examples described above. It is possible to use various ester synthetic oils and various synthetic hydrocarbon oils as the base oils, and it is possible to use various styrene block copolymers as the gelatinizers, without departing from the scope of the present invention.

By using the gel lubricant of the present invention in the rolling bearing, the rolling bearing can be stably driven at a low torque and with a small torque variation for a long period of time. Accordingly, a long service life can be realized for the rolling bearing in which the gel lubricant is enclosed or sealed, for the pivot assembly bearing provided with the rolling bearing, and for the hard disk drive including the pivot assembly bearing.

What is claimed is:

1. A gel lubricant comprising:
   a base oil containing an ester synthetic oil and a synthetic hydrocarbon oil in which a mass ratio (X:Y) of the ester synthetic oil (X) to the synthetic hydrocarbon oil (Y) is in the range of 35:65 to 75:25; and
   a gelatinizer consisting of two kinds of styrene block copolymers and being included in the gel lubricant in an amount of 1.5% by mass to 10% by mass in relation to total mass of the gel lubricant,
   wherein the two kinds of styrene block copolymers are selected from the group consisting of styrene-(ethylene/propylene)-styrene block copolymer, styrene-(ethylene-ethylene/propylene)-styrene block copolymer, styrene-(ethylene/propylene) block copolymer, and styrene-(ethylene/butylene)-styrene block copolymer, and
   wherein the base oil is in a gel state.

2. The gel lubricant according to claim 1, wherein the two kinds of styrene block copolymers are composed of a first styrene block copolymer and a second styrene block copolymer, and a mass ratio (m:n) of the first styrene block copolymer (m) to the second styrene block copolymer (n) is in the range of 80:20 to 20:80.

3. The gel lubricant according to claim 1, wherein the ester synthetic oil is at least one selected from the group consisting of trioctyl trimellitate, pentaerythritol fatty acid ester, and tetraoctyl pyromellitate, and the synthetic hydrocarbon oil is poly-α-olefin or alkyl naphthalene.

4. The gel lubricant according to claim 1, wherein the mass ratio (X:Y) of the ester synthetic oil (X) to the synthetic hydrocarbon oil (Y) is in the range of 40:60 to 70:30, and the gelatinizer is contained in the gel lubricant in an amount of 2% by mass to 9% by mass.

5. The gel lubricant according to claim 1, wherein the two kinds of styrene block copolymers are styrene-(ethylene/propylene)-styrene block copolymer and styrene-(ethylene-ethylene/propylene)-styrene block copolymer.

6. The gel lubricant according to claim 1, wherein the ester synthetic oil is trioctyl trimellitate and the synthetic hydrocarbon oil is poly-α-olefin.

7. The gel lubricant according to claim 1, further comprising an extreme pressure additive.

8. The gel lubricant according to claim 1, wherein the gel lubricant does not contain a thickener.

9. The gel lubricant according to claim 1, wherein the base oil is included in the gel lubricant in an amount of 85% by mass to 98% by mass.

10. A gel lubricant comprising:
    a base oil containing an ester synthetic oil and a synthetic hydrocarbon oil in which a mass ratio (Y) of the ester synthetic oil (X) to the synthetic hydrocarbon oil (Y) is in the range of 40:60 to 70:30; and
    a gelatinizer consisting of two kinds of styrene block copolymers and being included in the gel lubricant in an amount of 1.5% by mass to 10% by mass in relation to total mass of the gel lubricant,
    wherein the ester synthetic oil is trioctyl trimellitate and the synthetic hydrocarbon oil is poly-α-olefin;
    the two kinds of styrene block copolymers are composed of styrene-(ethylene/propylene)-styrene block copolymer as a first styrene block copolymer and styrene-(ethylene-ethylene/propylene)-styrene block copolymer as a second styrene block copolymer; and
    a mass ratio (m:n) of the first styrene block copolymer (m) to the second styrene block copolymer (n) is in the range of 80:20 to 20:80.

11. A rolling bearing comprising:
    an outer race;
    an inner race which is arranged coaxially with the outer race on an inner circumferential side of the outer race;
    a plurality of rolling elements disposed between the outer race and the inner race;
    a retainer retaining the rolling elements; and
    the gel lubricant as defined in claim 1 which is filled between the outer race and the inner race.

12. The rolling bearing according to claim 11, wherein a plurality of pockets for holding the rolling elements are formed in the retainer, and a lubricant retaining portion for retaining the gel lubricant is provided between the adjacent pockets.

13. The rolling bearing according to claim 12, wherein the lubricant retaining portion is provided with a recess or a protrusion.

14. The rolling bearing according to claim 12, wherein a circumferential wall is provided around the lubricant retaining portion.

15. A pivot assembly bearing comprising the rolling bearing as defined in claim 11.

16. A hard disk drive comprising the pivot assembly bearing as defined in claim 15.

* * * * *